Figure 1:
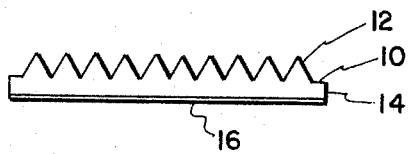

Oct. 18, 1966     P. A. WILKS, JR     3,279,307

SPECTRUM EXAMINATION OF SUBSTANCES

Filed Jan. 21, 1963

INVENTOR.
PAUL A. WILKS JR.
BY Joseph Levinson
ATTORNEY

United States Patent Office 3,279,307
Patented Oct. 18, 1966

3,279,307
SPECTRUM EXAMINATION OF SUBSTANCES
Paul A. Wilks, Jr., Darien, Conn., assignor to Barnes Engineering Company, Stamford, Conn., a corporation of Delaware
Filed Jan. 21, 1963, Ser. No. 252,997
5 Claims. (Cl. 88—14)

This invention relates to spectrum examination of substances, and more particularly to the spectrum examination by means of attenuated total reflection of radiation from samples which have been altered utilizing thin-layer chromatography.

Thin-layer chromatography is an alteration process to resolve mixtures of chemical compounds. The substance to be examined is placed on a suitable retaining medium called a sorbent, and the components of the substance are moved differentially in zones along or through the sorbent by means of a fluid called a solvent which is percolated through the medium generally by capillary action. Components of the mixture or substance under examination are retained on the sorbent by surface forces. These components move along the sorbent in bands in order of their affinity for the sorbent, each of which is displaced by the next more strongly sorbed component. The resulting array of bands or distribution of substance is compared to that which would be deposited by a known mixture for identifying the components in the substance. Elemental portions of the dispersed components might also be scraped from the sorbent and further analyzed. These methods of chemical analysis along with other approaches which have not been discussed have numerous drawbacks which include not being able to properly identify with a great deal of accuracy the components of the substance under examination particularly when the specimen available for test is small.

Accordingly, it is an object of this invention to provide a more accurate method of determining the chemical composition of substances which have been altered by means of chromatography.

The further processing of the materials deposited using chromatography is both time consuming and adds to the cost of the examination. Furthermore, only portions of the substance under examination may be capable of positive identification using known techniques.

Accordingly, it is an object of this invention to provide a quicker, more accurate, and less costly method for examining chemical properties of substances.

A further object of this invention is to provide a method of spectrum examination by means of attenuated total reflection of radiation from samples which have been altered utilizing thin-layer chromatography techniques.

Another object of this invention is to provide an attenuating total reflective plate suitable for use in the spectrum examination of materials deposited thereon utilizing thin-layer chromatography techniques.

In carrying out this invention in one illustrative embodiment thereof, a method of spectrum examination of substances is provided which comprises using a plate having optically flat side and an undulated surface on the opposite side thereof with flat side coated with an absorbent material, placing a sample to be examined on the coating, changing the sample into components using thin-layer chromatography techniques, applying a source of radiation to the undulated surface side of the plate and utilizing the reflected absorption spectrum reflected from the flat surface for examining the properties of the sample.

Figure 2:
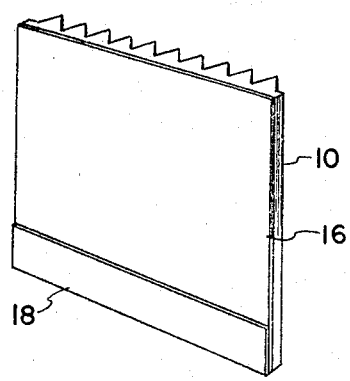
Figure 3:
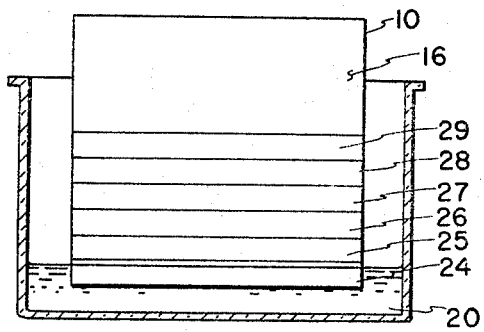
Figure 5:
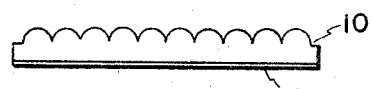
Figure 4:
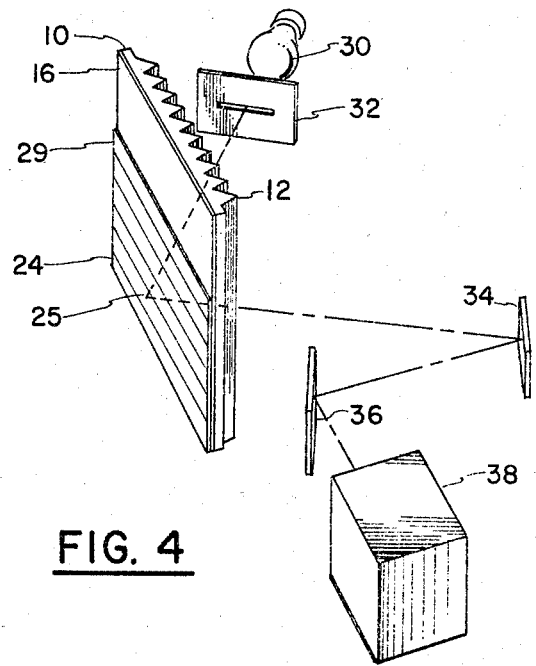

The invention, both as to organization and method of operation, together with further objects and advantages thereof, may best be understood by reference to the following description taken in connection with the accompanying drawings, in which:

FIG. 1 is a cross-sectional view of an attenuated total reflection plate utilized in this invention, FIG. 2 is a perspective view of the plate of FIG. 1 showing a sample to be examined deposited thereon, FIG. 3 shows the of FIG. 2 being immersed at one edge thereof in a liquid which distributes portions of the substance under examination along the coated surface of the plate, FIG. 4 is a schematic diagram of the examination of the sample distributed as shown in FIG. 3 by the application of radiation thereto, and FIG. 5 shows an alternative type of total attenuation reflection plate which may be utilized.

In Patent No. 3,177,759 issued to the inventor of the present application, an attenuating total reflection plate is described for use in spectrum examination of material. The plate of radiation-transparent material has an undulating surface on one side thereof and an optically flat surface on the other side. By placing a sample on the optical flat surface of the plate and passing radiation substantially perpendicular to the undulated side of the plate the sample may be spectrally examined. The radiation passing to the optically flat surface of the plate would normally be totally reflected from the optically flat surface but with the sample in contact with the flat surface the radiation is selectively absorbed, providing a reflected output from the undulating side of the plate which provides an absorption spectrum which may be utilized to identify the substance under test. The absorption spectrum so produced might be compared to finger-print identification of individuals. Different materials selectively absorb different amounts of radiation, so that they may be identified by their absorption spectrums. An attenuating total reflecting plate of this type is modified and is used in this invention.

Referring now to FIG. 1, an attenuated total reflection plate 10 is shown having an undulated surface 12 in the form of prisms on one side thereof and an optically flat surface 14 on the other side thereof. The optically flat surface 14 is provided with a coating 16 by any suitable means such as applying a dispersion to the surface 14 which will adhere thereto, or by spraying or painting the coating 16 on the surface 14. The coating 16 is the retaining medium referred to above, called a solvent, and consists of an absorbent material such as alumina, magnesia, silica gel, or other materials of similar characteristics. As one illustrative example, a coating may be applied to the plate 10 by putting a mask on the flat surface 14, which will retain a mixture of solvent and absorbent. A mixture of equal parts of talc and water or alcohol has been found to be suitable for producing a good bond to the surface 14, but the particular proportions are not critical and a ratio of two parts solvent to one part absorbent may be used. The mixture is then dried and the water or alcohol is evaporated out, leaving a good bond between the absorbent material and the flat surface 14.

In making a chemical analysis, a sample 18 to be examined is placed on the coating or sorbent 16 as is shown in FIG. 2. The size of the sample is greatly exaggerated and not necessarily shaped as shown, but is so shown for ease and clarity in illustration. An edge of the plate 10 is then immersed in a fluid 20 as shown in FIG. 3. The fluid 20 is characterized by being able to move along or percolate through the sorbent 16 by capillary action. A solvent having the aforesaid characteristics such as benzene has been found suitable. When the plate 10 having the sample to be examined such as, for example, a drop of body fluid is dipped on one edge thereof into the fluid 20, the fluid 20 moves along the plate 10 on the coating side 16 thereof carrying with it portions 24, 25, 26, 27, 28 and 29 of the sample 18 and deposits them in bands along the sorbent 16 in order of their affinity for the sorbent 16.

Once the sample 18 is changed into bands or portions 24 through 29 as shown in FIG. 3, the portions 24 through 29 are ready for spectrum analysis which is accomplished in a manner shown in FIG. 4. A source of radiation 30 is applied through a slit 32 at an angle which is substantially perpendicular to a portion of the undulating surface 12 on the plate 10. The radiation 30 that is passed into the undulated surface 12 would be totally reflected from the optically flat surface 14 of the plate 10 if nothing was in contact with the surface 14. However, the portion of the radiation 30 which escapes from the totally reflecting surface 14 and is returned into the plate 10 penetrates the coating 16 and the sample, as is represented on FIG. 4 as portion 25 which is in contact with the reflecting surface 14. The energy which temporarily escapes from plate 10 is selectively absorbed by the coating 16 as well as the portion 25 and is reflected out of the plate 10 to a mirror 34 which reflects the radiation to a mirror 36 which directs the radiation to a spectrometer 38 for analysis. In the spectrometer 38 the absorption spectrum of the sample can be studied to determine the characteristics of the sample under observation. By knowing the absorption spectrum for the coating 16, an absorption spectrum for the sample 25 is provided which makes possible the chemical analysis of this type of sample. By moving the plate 10 along the entire path of travel of the original sample 18 or in other words between the portions or bands 24 through 29, a chemical analysis of the entire sample is made possible. Alternatively, the source of radiation 30 might be moved along the path which, of course, would require the optical means associated with the spectrometer to be moved in step therewith or require the movement of the spectrometer.

In FIG. 5 there is shown another form of plate 10 which may be utilized for spectrum examination of substances. The plate 10 in FIG. 5 differs from that in FIG. 4 by having a different undulated surface, which in the case of FIG. 5 comprises semi or half-cylinders. Other forms might also be available with the necessary requirement being that the radiation enter the undulating surface substantially perpendicular thereto and that it also leave in the same manner. It will also be obvious that a single undulation might be used in the present method. For example, a single prism or semi-cylinder might be employed which, of course, would restrict the deposition of the portions of the sample under examination to the width of the base of the half-cylinder or prism.

It is believed readily apparent that the applicant's method of distributing a sample to be examined in the manner set forth using thin-layer chromatography techniques and then examining individually the distributed portions by attenuated total reflectance provides a more accurate method of chemical analysis than was previously available by utilizing each separately. Furthermore, greater accuracy in identification of the various elemental portions of the sample is provided than would be the case of comparing chromatograms of the samples with known chromatograms. This method of chemical analysis is also advantageous by the fact that standard equipment may be utilized, and no expensive or additional equipment is necessary. Furthemore, a means of examination is provided for some substances for which no previous means was available, particularly in the case of small samples.

Since other modifications varied to fit particular operating requirements and environments will be apparent to those skilled in the art, the invention is not considered limited to the examples chosen for the purposes of disclosure, and covers all changes and modifications which do not constitute departures from the true spirit and scope of this invention.

What I claim as new and desire to secure by Letters Patent of the United States is:

1. A method of spectrum examination of materials comprising the steps of
    (a) placing a sample to be examined on a coating of absorbent material on the optically flat side of a plate transparent in the spectral range of interest which has an undulating surface on the other side thereof,
    (b) immersing an edge of said plate in a fluid that moves along the coated side of said plate by capillary action, thereby separating the sample into separate band-like areas,
    (c) applying radiation to the plate at an angle such that the radiation passes through the undulating surface of the plate and produces attenuated total reflection from the flat surface of the plate, whereby the attenuation of the radiation is related to the absorption characteristics of the sample,
    (d) scanning the bandlike areas on said plate with said radiation to provide an absorption spectrum for each scanned area, and
    (e) utilizing the absorption spectrums of said radiation for examining the properties of said sample.

2. The method set forth in claim 1 in which said source of radiation is infrared radiation.

3. The method set forth in claim 1 wherein the scanning of the bandlike area includes moving the plate along the path of the bandlike areas.

4. The method set forth in claim 1 wherein the scanning of the bandlike areas includes moving the source of radiation along the undulated surface in the same path over which the bandlike areas appear.

5. The method set forth in claim 1 in which the plate has a single undulation thereon.

References Cited by the Examiner

UNITED STATES PATENTS

| 2,463,280 | 3/1949 | Kaehni et al. | 88—1 |
| 2,482,598 | 9/1949 | Roos | 88—1 |
| 2,849,618 | 8/1958 | Smith | 88—14 |
| 2,912,895 | 11/1959 | Hamilton | 88—14 |
| 3,157,788 | 11/1964 | Roche | 88—14 X |
| 3,177,759 | 4/1965 | Wilks | 88—14 |
| 3,189,541 | 6/1965 | Brenner et al. | 210—31 |

OTHER REFERENCES

Gamp et al.: "Dunnschicht-Chromatographic auf Linienglas," Experientia, vol. 18, No. 6., June 15, 1962, pp. 292–3.

Heyns et al.: Kombination von Dunnschichtcromatographic and Massenspettrographic," Angewandte Chemie, vol. 74, No. 11, June 7, 1962, p. 387.

JEWELL H. PEDERSEN, *Primary Examiner.*

RONALD L. WIBERT, *Examiner.*

L. ORLOFF, E. S. BAUER, *Assistant Examiners.*